United States Patent
Park et al.

(10) Patent No.: US 11,933,910 B2
(45) Date of Patent: Mar. 19, 2024

(54) PULSE RADAR APPARATUS AND METHOD OF OPERATING THEREOF

(71) Applicant: ELECTRONICS AND TELECOMMUNICATIONS RESEARCH INSTITUTE, Daejeon (KR)

(72) Inventors: Pil Jae Park, Daejeon (KR); Seongdo Kim, Daejeon (KR); Bon Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 182 days.

(21) Appl. No.: 17/481,894

(22) Filed: Sep. 22, 2021

(65) Prior Publication Data
US 2022/0179041 A1 Jun. 9, 2022

(30) Foreign Application Priority Data
Oct. 26, 2020 (KR) .................. 10-2020-0138994

(51) Int. Cl.
*G01S 7/34* (2006.01)
*G01S 13/88* (2006.01)

(52) U.S. Cl.
CPC .............. *G01S 7/34* (2013.01); *G01S 13/888* (2013.01)

(58) Field of Classification Search
CPC .................................. G01S 7/34; G01S 13/888
See application file for complete search history.

(56) References Cited

U.S. PATENT DOCUMENTS

| | | | |
|---|---|---|---|
| 5,805,110 A | 9/1998 | McEwan | |
| 7,551,703 B2 | 6/2009 | McEwan | |
| 10,819,365 B1* | 10/2020 | Nguyen | ............... H03M 1/742 |
| 2002/0136251 A1* | 9/2002 | Green | .................. G01S 7/4802 |
| | | | 372/38.07 |
| 2006/0187111 A1* | 8/2006 | Uchino | ................... G01S 7/285 |
| | | | 342/84 |
| 2007/0216567 A1* | 9/2007 | Ikeda | .................... G01S 7/4004 |
| | | | 342/134 |
| 2008/0238555 A1* | 10/2008 | Chapski | ............... G11C 29/023 |
| | | | 331/44 |

(Continued)

FOREIGN PATENT DOCUMENTS

| | | |
|---|---|---|
| JP | H11231044 A | 8/1999 |
| JP | 2012032161 A | 2/2012 |

(Continued)

OTHER PUBLICATIONS

A.T. Phan et al., "Low-Power Sliding Correlation CMOS UWB Pulsed Radar Receiver for Motion Detection," 2009 IEEE International Symposium on Circuits and Systems, pp. 1541-1544, Jun. 26, 2009.

*Primary Examiner* — Bernarr E Gregory
*Assistant Examiner* — Hailey R Le
(74) *Attorney, Agent, or Firm* — Rabin & Berdo, P.C.

(57) ABSTRACT

Disclosed is a pulse radar apparatus including a clock generator generating a transmission clock signal, a reception clock signal, and a sensitivity adjustment interval signal, a transmitter radiating a transmission pulse based on the transmission clock signal, and a receiver receiving a first pulse and a second pulse, which are associated with the transmission pulse, with different sensitivities based on the reception clock signal and the sensitivity adjustment interval signal.

18 Claims, 9 Drawing Sheets

(56) References Cited

U.S. PATENT DOCUMENTS

| | | | | |
|---|---|---|---|---|
| 2011/0062925 | A1* | 3/2011 | Han | G09G 3/3696 |
| | | | | 323/282 |
| 2013/0194251 | A1* | 8/2013 | Cheng | G09G 3/3648 |
| | | | | 345/92 |
| 2013/0229297 | A1 | 9/2013 | Mukai | |
| 2014/0354469 | A1* | 12/2014 | Park | G01S 13/103 |
| | | | | 342/195 |
| 2018/0059232 | A1* | 3/2018 | Park | G01S 13/12 |
| 2019/0025417 | A1 | 1/2019 | Park et al. | |
| 2020/0212916 | A1* | 7/2020 | Moe | H03K 3/0315 |
| 2021/0041550 | A1* | 2/2021 | Kallfass | G01N 22/00 |

FOREIGN PATENT DOCUMENTS

| | | |
|---|---|---|
| JP | 5634238 B2 | 12/2014 |
| JP | 2015-037214 A | 2/2015 |
| KR | 10-2018-0025131 A | 3/2018 |
| KR | 20190010402 A | 1/2019 |
| KR | 20190049096 A | 5/2019 |

\* cited by examiner

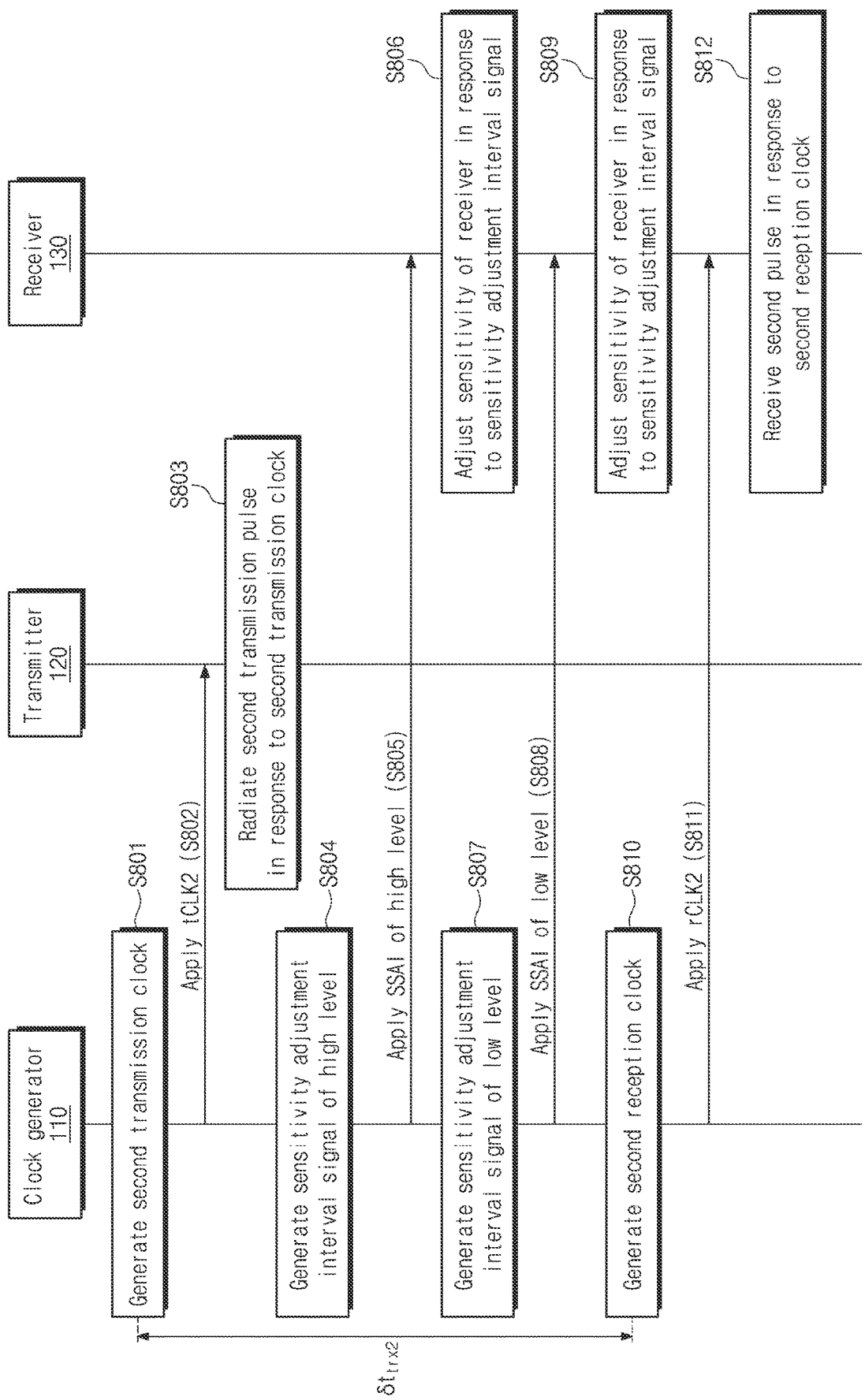

PULSE RADAR APPARATUS AND METHOD OF OPERATING THEREOF

CROSS-REFERENCE TO RELATED APPLICATIONS

This application claims priority under 35 U.S.C. § 119 to Korean Patent Application No. 10-2020-0138994 filed on Oct. 26, 2020, in the Korean Intellectual Property Office, the disclosures of which are incorporated by reference herein in their entireties.

BACKGROUND

Embodiments of the present disclosure described herein relate to a pulse radar apparatus and an operating method thereof, and more particularly, relate to a pulse radar apparatus that penetrates an obstacle, and an operating method thereof.

A pulse radar apparatus includes a transmitter and a receiver. The transmitter may repeatedly radiate a transmission pulse. The receiver may receive an echo pulse which is the reflected transmission pulses from a target. The pulse radar apparatus obtains information about the target from the received echo pulse. The clock-based pulse radar apparatus radiates a transmission pulse in response to a transmission clock, and receives an echo pulse in response to a reception clock. The pulse radar apparatus may detect objects located within various distances by varying a transmission/reception clock delay between the transmission clock and the reception clock.

Obstacles such as walls may be present between the pulse radar apparatus and the target. A penetrable pulse radar apparatus (i.e., through-wall radar) may receive echo pulses from the target located beyond obstacles. However, the pulse radar apparatus may receive a disturb pulse which is a reflected transmission pulse from the obstacle. The transmission pulse is a pulse which is radiated from the transmitter of the pulse radar apparatus. The disturb pulse may saturate the receiver, thereby degrading the performance of the receiver.

SUMMARY

Embodiments of the present disclosure provide penetrable pulse radar with improved performance and an operating method thereof.

According to an embodiment, a pulse radar apparatus includes a clock generator generating a transmission clock signal, a reception clock signal, and a sensitivity adjustment interval signal, a transmitter radiating a transmission pulse based on the transmission clock signal, and a receiver receiving a first pulse and a second pulse, which are associated with the transmission pulse, with different sensitivities based on the reception clock signal and the sensitivity adjustment interval signal. The sensitivity adjustment interval signal is based on a amplitude of a transmission/reception clock delay time that is an interval between the transmission clock signal and the reception clock signal.

According to an embodiment, an operating method of a pulse radar apparatus includes radiating a transmission pulse in response to a transmission clock signal, decreasing a sensitivity of a receiver in response to a sensitivity adjustment interval signal of a high level, receiving a first pulse associated with the transmission pulse in response to a reception clock signal, increasing the sensitivity of the receiver in response to a sensitivity adjustment interval signal of a low level, and receiving a second pulse associated with the transmission pulse in response to the reception clock signal. The sensitivity adjustment interval signal is generated based on a length of a transmission/reception clock delay time that is an interval between a first point in time when the transmission clock signal is generated and a second point in time when the reception clock signal is generated.

BRIEF DESCRIPTION OF THE FIGURES

The above and other objects and features of the present disclosure will become apparent by describing in detail embodiments thereof with reference to the accompanying drawings.

FIG. 8 illustrates a flowchart of an operating method of a pulse radar apparatus, according to still another embodiment of the present disclosure.

DETAILED DESCRIPTION

Hereinafter, embodiments of the present disclosure may be described in detail and clearly to such an extent that an ordinary one in the art easily implements the present disclosure.

Hereinafter, the best embodiment of the present disclosure will be described in detail with reference to accompanying drawings. With regard to the description of the present disclosure, to make the overall understanding easy, similar components will be marked by similar reference signs/numerals in drawings, and thus, additional description will be omitted to avoid redundancy.

Hereinafter, signals, which are generated or used by the pulse radar apparatus, may have a high-level voltage or a low-level voltage. The high-level voltage may correspond to a logic high value. The low-level voltage may correspond to a logic low value. The expression 'high-level signal' may be understood as a 'signal having a high-level voltage'. In addition, the expression 'low-level signal' may be understood as a 'signal having a low-level voltage'.

Figure 1:
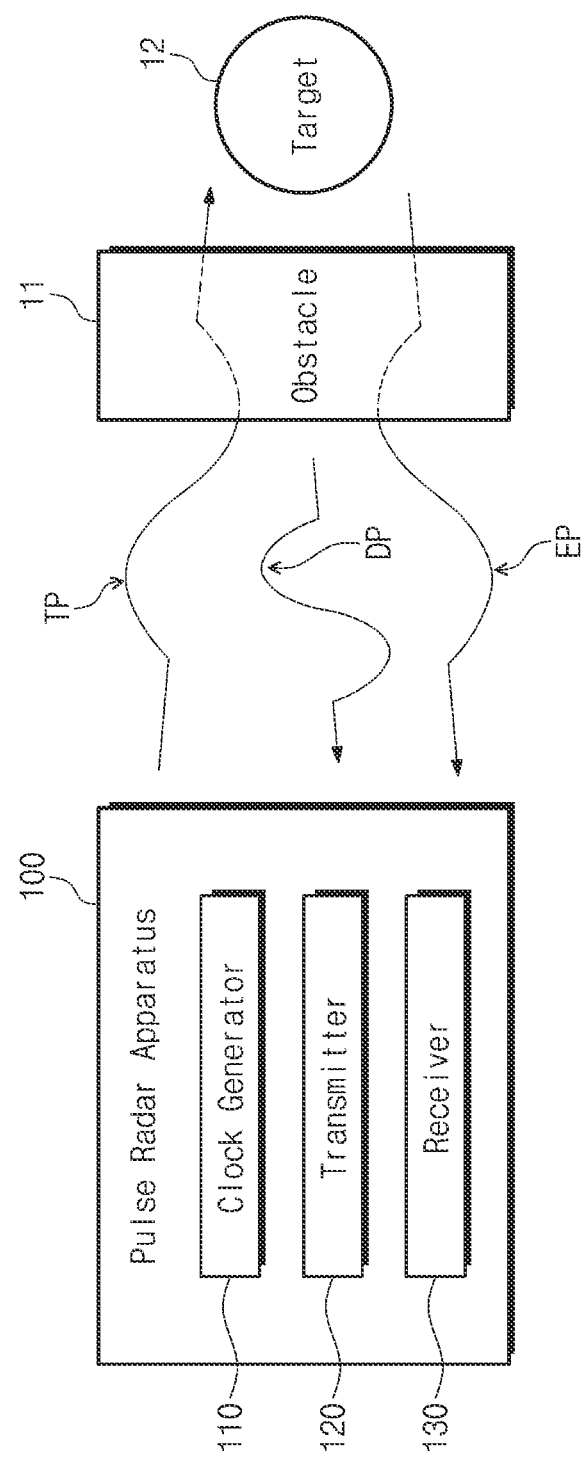
FIG. 1 illustrates a pulse radar apparatus and an operating method thereof, according to an embodiment of the present disclosure.

FIG. 1 illustrates a pulse radar apparatus and an operating method thereof, according to an embodiment of the present disclosure. Referring to FIG. 1, a pulse radar apparatus 100 may radiate a transmission pulse TP. For example, the pulse radar apparatus 100 may radiate the transmission pulse TP to one or more objects including a target 12 or an obstacle 11. In the illustrated embodiment, the target 12 may be located beyond the obstacle 11. The transmission pulse TP may penetrate the obstacle 11 and then may reach the target 12. The obstacle 11 may be a wall. The obstacle 11 may also be referred to as a "penetration object". For example, the transmission pulse TP may include electromagnetic waves such as radio waves, infrared rays, visible rays, ultraviolet rays, X rays, gamma rays, or the like.

The pulse radar apparatus 100 may receive a disturb pulse DP and the echo pulse EP. The disturb pulse DP may be a reflected transmission pulse TP from the obstacle 11. The echo pulse EP may be a reflected transmission pulse TP from the target 12. The pulse radar apparatus 100 may obtain information about the target 12 by analyzing the echo pulse EP. For example, the pulse radar apparatus 100 may obtain a distance from the pulse radar apparatus 100 to the target 12, an azimuth angle formed between the pulse radar apparatus 100 and the target 12, or the like.

The target 12 may include a fixed object and a moving object. The pulse radar apparatus 100 may obtain location information and speed information of an object by obtaining a distance from the pulse radar apparatus 100 to the target 12 or an azimuth angle formed between the pulse radar apparatus 100 and the target 12.

The pulse radar apparatus 100 may include a clock generator 110, a transmitter 120, and a receiver 130. The clock generator 110 may generate signals necessary for the operations of the transmitter 120 and the receiver 130. The clock generator 110 may apply the generated signals to the transmitter 120 and the receiver 130. The transmitter 120 may radiate the transmission pulse TP in response to a signal applied from the clock generator 110. The receiver 130 may receive the echo pulse EP or the disturb pulse DP in response to a signal applied from the clock generator 110. For example, the pulse radar apparatus 100 may obtain the distance between the pulse radar apparatus 100 and the target 12, based on a delay time between signals generated by the clock generator 110. The detailed operations of the clock generator 110, the transmitter 120, and the receiver 130 will be described later.

The amplitude of the disturb pulse DP associated with the obstacle 11 may be significantly greater than the amplitude of the echo pulse EP associated with the target 12. Accordingly, the receiver 130 may be saturated due to the disturb pulse DP. As a result, the performance of the receiver 130 may deteriorate due to the disturb pulse DP. To prevent performance deterioration of the receiver 130, the pulse radar apparatus 100 may reduce the influence of the disturb pulse DP by adjusting the sensitivity of the receiver 130. Accordingly, the performance of the pulse radar apparatus 100 may be improved.

In an embodiment, the pulse radar apparatus 100 may adjust the reception sensitivity of the receiver 130 by allowing an interval, in which a voltage level of a signal generated by the clock generator 110 is a high level, to have a specific length based on a clock applied to the transmitter 120. For example, the pulse radar apparatus 100 may control a gain for the disturb pulse DP received by the receiver 130, in response to the voltage level of the signal generated by the clock generator 110. The detailed operation of adjusting the reception sensitivity of the receiver 130 by the pulse radar apparatus 100 will be described later.

Figure 2:
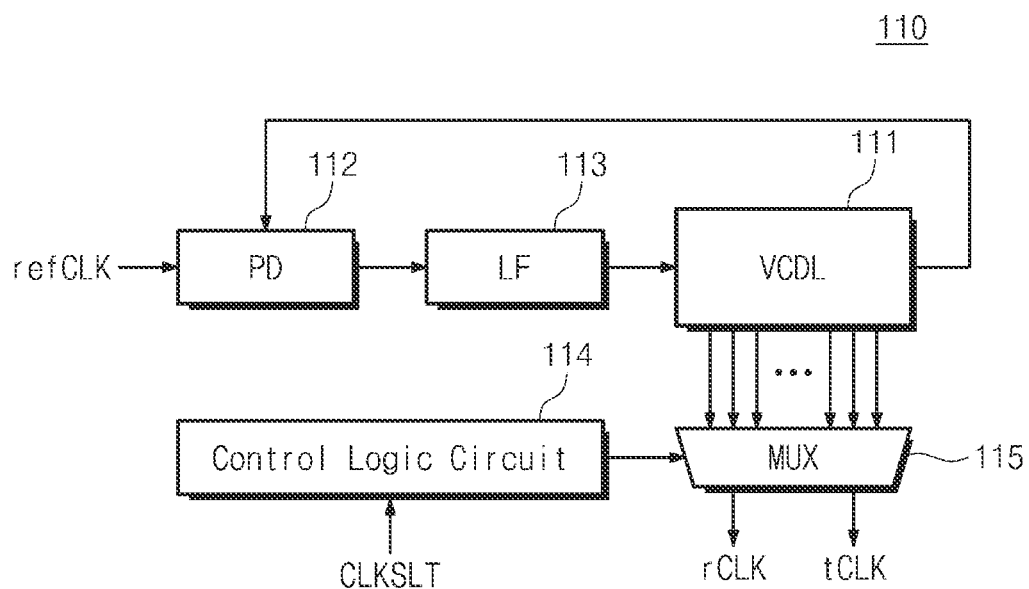
FIG. 2 illustrates a block diagram of the clock generator of FIG. 1 in more detail.

FIG. 2 illustrates a block diagram of the clock generator of FIG. 1 in more detail. Referring to FIGS. 1 and 2, the clock generator 110 may include a voltage controlled delay line (VCDL) 111, a phase detector (PD) (or a phase comparator) 112, a loop filter (LF) 113, a control logic circuit 114, and a multiplexer (MUX) 115. The clock generator 110 may obtain a reference clock refCLK from an external device of the pulse radar apparatus 100 or a controller of the pulse radar apparatus 100. The clock generator 110 may generate a transmission clock tCLK and a reception clock rCLK by using the reference clock refCLK.

The clock generator 110 may generate a plurality of clocks by using a delay locked loop (DLL), may output one of the plurality of clocks as the transmission clock tCLK, and may output one of the plurality of clocks as the reception clock rCLK.

The phase detector 112 may detect (or compare) phases of clocks applied from the voltage controlled delay line 111. For example, the phase detector 112 may compare the phase of the reference clock refCLK with one of clocks generated by the voltage controlled delay line 111.

The phase detector 112 may output, to the loop filter 113, a phase information signal based on the comparison result of the phases of the clocks. The loop filter 113 may filter the phase information signal applied from the phase detector 112. The loop filter 113 may output the filtered phase information signal to the voltage controlled delay line 111.

The voltage controlled delay line 111 may obtain a signal filtered by the loop filter (LF) 113. The voltage controlled delay line 111 may be implemented with a plurality of stages. The voltage controlled delay line 111 may generate clocks having various delays by using the signal, which is associated with the reference clock refCLK and which is filtered by the loop filter (LF) 113. For example, the voltage controlled delay line 111 may generate clocks delayed by a time that is equally dividing a period of the reference clock refCLK by the plurality of stages. The voltage controlled delay line 111 may output the generated clocks to the phase detector 112 and the multiplexer 115. Accordingly, the clocks generated by the voltage controlled delay line 111 may return to the voltage controlled delay line 111 through phase detection and filter. In other words, the clocks generated by the voltage controlled delay line 111 may be fed back through the phase detector 112 and the loop filter 113.

The control logic circuit 114 may obtain a clock selection signal CLKSLT from the external device of the pulse radar apparatus 100 or the controller inside the pulse radar apparatus 100. The control logic circuit 114 may control the multiplexer 115 in response to the clock selection signal CLKSLT.

The multiplexer 115 may obtain a plurality of clocks from the voltage controlled delay line 111. Under control of the control logic circuit 114, the multiplexer 115 may generate the transmission clock tCLK and the reception clock rCLK by selecting a part of the plurality of clocks generated at each stage of the voltage controlled delay line 111 having a plurality of stages.

For example, the multiplexer 115 may select a signal having a predetermined (specific) phase difference from the reference clock refCLK under control of the control logic circuit 114. As the multiplexer 115 selects the transmission clock tCLK and the reception clock rCLK, each of which has a predetermined phase, the clock generator 110 may output the transmission clock tCLK and the reception clock rCLK.

Figure 3A:
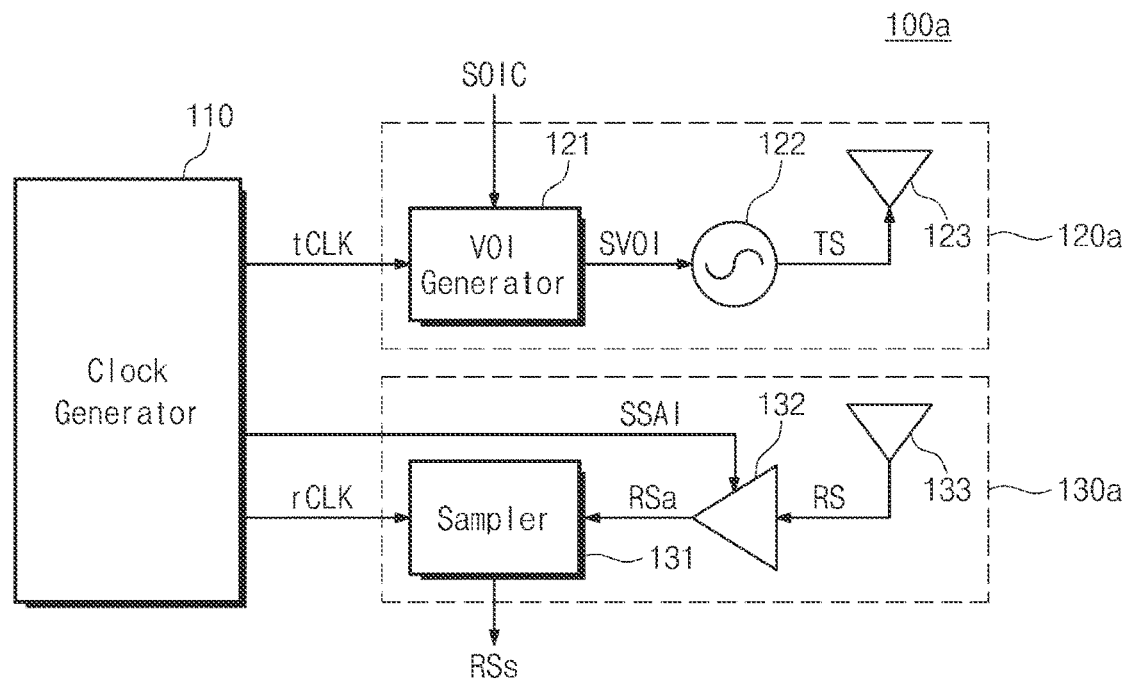
FIG. 3A illustrates a block diagram of a pulse radar apparatus, according to an embodiment of the present disclosure.
Figure 3B:
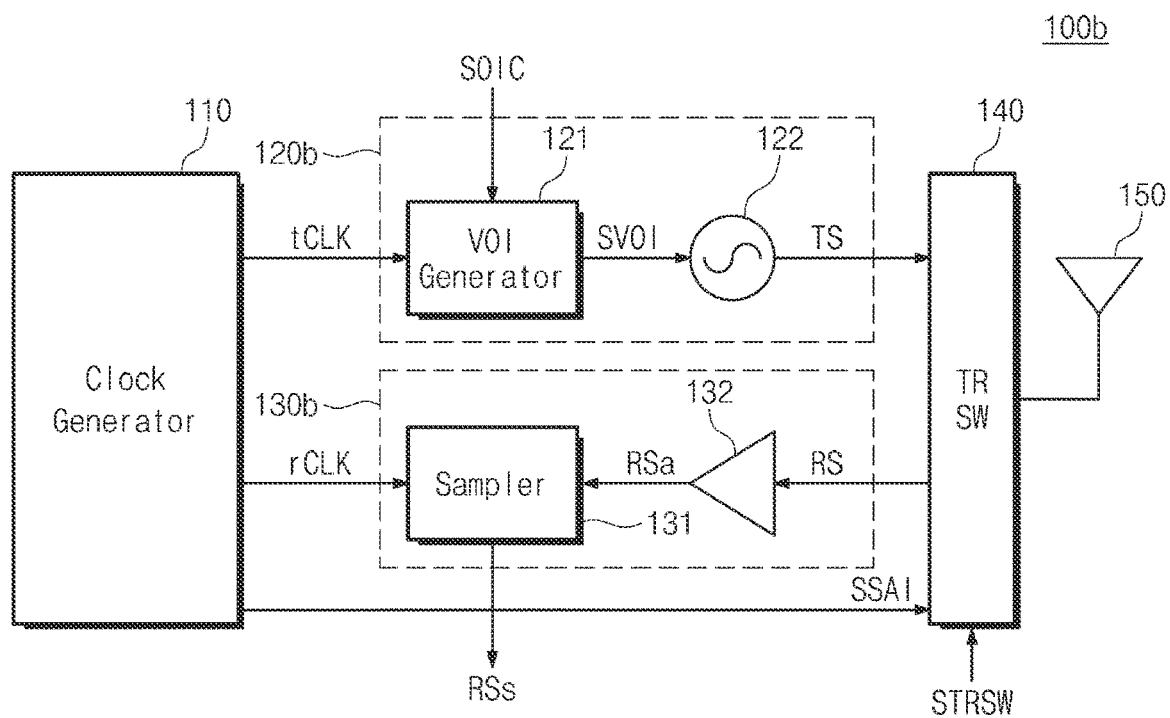
FIG. 3B illustrates a block diagram of a pulse radar apparatus, according to another embodiment of the present disclosure.

As another example, the multiplexer 115 may select one of the plurality of clocks received from the voltage controlled delay line 111, as a sensitivity adjustment interval control signal (e.g., a sensitivity adjustment interval signal SSAI of FIGS. 3A and 3B). In an embodiment, the sensitivity adjustment interval signal selected and output by the multiplexer 115 may refer to a signal having a high level during a predetermined time after a predetermined delay time from the occurrence of a rising edge of the transmission clock tCLK.

For example, the control logic circuit 114 may adjust a value of a transmission/reception clock delay (e.g., $\delta t_{trx}$ in FIGS. 5A and 5B), which is an interval between the rising edge of the transmission clock tCLK and the rising edge of the reception clock rCLK, in response to the clock selection signal CLKSLT. The transmission/reception clock delay may be determined as a value of a time obtained by dividing the period of the reference clock refCLK. The pulse radar apparatus 100 may change a radar detection range by varying the transmission/reception clock delay.

The control logic circuit 114 may set a value of the transmission/reception clock delay corresponding to a minimum detection distance of the pulse radar apparatus 100 and a value of the transmission/reception clock delay corresponding to a maximum detection distance. The value of the transmission/reception clock delay corresponding to the minimum detection distance may be a minimum of its value. The value of the transmission/reception clock delay corresponding to the maximum detection distance may be a maximum of its value. In an embodiment, the control logic circuit 114 may set the value of the transmission/reception clock delay corresponding to a distance between the pulse radar apparatus 100 and the obstacle 11, based on information obtained from the disturb pulse DP. The transmission/reception clock delay and other signals generated by the clock generator 110 depending on the transmission/reception clock delay will be described later with reference to FIGS. 5A and 5B.

Unlike the illustration of FIG. 2, the clock generator 110 may generate other signals (e.g., the sensitivity adjustment interval signal SSAI of FIGS. 3A and 3B) in addition to the transmission clock tCLK and the reception clock rCLK. For example, the control logic circuit 114 may set a value of the transmission/reception clock delay. In addition, the control logic circuit 114 may control the multiplexer 115 such that various signals used in the pulse radar apparatus 100 are output from the multiplexer 115 based on the set value of the transmission/reception clock delay.

FIG. 3A illustrates a block diagram of a pulse radar apparatus, according to an embodiment of the present disclosure. Referring to FIGS. 1 and 3A, a pulse radar apparatus 100a may include the clock generator 110, a transmitter 120a, and a receiver 130a. The pulse radar apparatus 100a of FIG. 3A may include the single transmitter 120a and the single receiver 130a. However, unlike the illustration of FIG. 3A, the pulse radar apparatus 100a may include a plurality of transmitters and a plurality of receivers. Each of the plurality of transmitters may operate in a method similar to a method of the transmitter 120a. Each of the plurality of receivers may operate in a method similar to a method of the receiver 130a.

In a method similar to a method of generating the transmission clock tCLK and the reception clock rCLK, the clock generator 110 may generate the sensitivity adjustment interval signal SSAI. For example, the clock generator 110 may generate the sensitivity adjustment interval signal SSAI based on the value of transmission/reception clock delay.

The clock generator 110 may apply the transmission clock tCLK to the transmitter 120a. The clock generator 110 may apply the reception clock rCLK and the sensitivity adjustment interval signal SSAI to the receiver 130a. The sensitivity adjustment interval signal SSAI will be described later in detail with reference to FIGS. 5A and 5B.

The transmitter 120a may include a variable oscillation interval generator 121 (hereinafter referred to as a "VOI generator"), a voltage-controlled oscillator 122 (hereinafter referred to as a "VCO"), and a transmission antenna 123.

The VOI generator 121 may obtain the transmission clock tCLK from the clock generator 110. The VOI generator 121 may obtain an oscillation interval control signal SOIC. The oscillation interval control signal SOIC may be generated by an external device of the pulse radar apparatus 100 or a controller (not shown) inside the pulse radar apparatus 100. The VOI generator 121 may generate a variable oscillation interval signal SVOI based on the transmission clock tCLK and the oscillation interval control signal SOIC. The VOI generator 121 may output the variable oscillation interval signal SVOI to the VCO 122.

For example, the VOI generator 121 may generate the variable oscillation interval signal SVOI of a high level in response to the rising edge of the transmission clock tCLK. Accordingly, the period of the variable oscillation interval signal SVOI may be substantially the same as a period of the transmission clock tCLK. A time interval in which the variable oscillation interval signal SVOI has a high-level voltage may be changed based on the oscillation interval control signal SOIC. As the time interval in which the variable oscillation interval signal SVOI has a high level is changed, the oscillation duration and oscillation amplitude of a transmission signal TS generated by the VCO 122 may be varied. Accordingly, detection features of the pulse radar apparatus 100 may be varied. To generate the variable oscillation interval signal SVOI, the VOI generator 121 may include one or more of various types of pulse generators.

The VCO 122 may obtain the variable oscillation interval signal SVOI from the VOI generator 121. The VCO 122 may generate the transmission signal TS in response to a high level of the variable oscillation interval signal SVOI. The transmission signal TS may be an oscillating signal at a specific frequency. The VCO 122 may output the transmission signal TS to the transmission antenna 123.

The transmission antenna 123 may obtain the transmission signal TS from the VCO 122. The transmission antenna 123 may radiate the transmission pulse TP based on the transmission signal TS. Features of the transmission pulse TP may be characterized based on the amplitude, duration, or frequency of the transmission signal TS.

The receiver 130a may include a sampler 131, an amplifier 132, and a reception antenna 133. The reception antenna 133 may obtain the disturb pulse DP or the echo pulse EP. The reception antenna 133 may deliver a reception signal RS based on the received disturb pulse DP or the received echo pulse EP. The reception antenna 133 may deliver the reception signal RS to the amplifier 132. The feature of the reception signal RS may be associated with the feature of the corresponding disturb pulse DP or the corresponding echo pulse EP.

The amplifier 132 may obtain the reception signal RS from the reception antenna 133. The amplifier 132 may obtain the sensitivity adjustment interval signal SSAI from the clock generator 110. The amplifier 132 may amplify the reception signal RS in response to the sensitivity adjustment interval signal SSAI. For example, the amplifier 132 may be implemented with a low-noise amplifier, a parametric amplifier, a field effect transistor amplifier, a tunnel diode amplifier, or a low-noise traveling-wave tube amplifier. The amplifier 132 may generate an amplified reception signal RSa by amplifying the reception signal RS. The amplifier 132 may output the amplified reception signal RSa to the sampler 131. The gain of the amplifier 132 may be changed in response to the sensitivity adjustment interval signal SSAI.

In an embodiment, the gain of the amplifier 132 may be lowered in response to the sensitivity adjustment interval signal SSAI of a high level. Accordingly, the amplitude of the amplified reception signal RSa generated by the amplifier 132 may be reduced. The gain of the amplifier 132 may be increased in response to the sensitivity adjustment interval signal SSAI of a low level (or the gain of the amplifier 132 may be set to a predetermined default value). Accordingly, the amplitude of the amplified reception signal RSa generated by the amplifier 132 may be increased.

In another embodiment, the sensitivity adjustment interval signal SSAI may have an analog voltage value. The gain of the amplifier 132 may be proportional to a voltage value of the sensitivity adjustment interval signal SSAI. For example, the minimum gain may correspond to a minimum value of the sensitivity adjustment interval signal SSAI. The maximum gain may correspond to a maximum value of the sensitivity adjustment interval signal SSAI. The sensitivity adjustment interval signal SSAI may be continuously changed between the maximum value and the minimum value. Accordingly, the gain of the amplifier 132 may be continuously changed.

The sampler 131 may obtain the reception clock rCLK from the clock generator 110. The sampler 131 may obtain the amplified reception signal RSa from the amplifier 132. The sampler 131 may sample the amplified reception signal RSa based on the reception clock rCLK. For example, the sampler 131 may generate a sampled reception signal RSs by sampling the amplified reception signal RSa in response to a rising edge of the reception clock rCLK. The sampler 131 may output the sampled reception signal RSs.

The sampled reception signal RSs may be associated with the corresponding echo pulse EP or the corresponding disturb pulse DP. The pulse radar apparatus 100 may obtain information about the target 12 or the obstacle 11 corresponding to the sampled reception signal RSs by analyzing the sampled reception signal RSs. For example, the pulse radar apparatus 100 may obtain information about a distance from the pulse radar apparatus 100 to the target 12 or the obstacle 11 based on a value of the transmission/reception clock delay.

The pulse radar apparatus 100 may obtain the value of the transmission/reception clock delay corresponding to the distance from the pulse radar apparatus 100 to the target 12 or the obstacle 11, by analyzing the sampled reception signal RSs. For example, the pulse radar apparatus 100 may set a detection distance by varying the value of the transmission/reception clock delay. Similarly to that described later with reference to FIG. 5A, the value of the transmission/reception clock delay may be continuously increased from the minimum value to the maximum value. This may correspond to performing detection operation from the minimum distance value to the maximum distance value. The pulse radar apparatus 100 may determine that the disturb pulse DP corresponds to sampled reception signal RS s which is corresponding to a point in time when it is determined that the amplitude of the reception signal RS is the maximum. When it is determined, by the pulse radar apparatus 100, that the sampled reception signal RSs corresponds to the disturb pulse DP, the value of the transmission/reception clock delay corresponding to the sampled reception signal RSs may be determined. And the distance from the pulse radar apparatus 100 to the obstacle 11 may be determined. Accordingly, the pulse radar apparatus 100 may automatically obtain the value of the transmission/reception clock delay corresponding to the distance from the pulse radar apparatus 100 to the obstacle 11.

In an embodiment, the pulse radar apparatus 100 may adjust the length of a time interval (e.g., a sensitivity adjustment interval $t_{SA}$ in FIG. 5A) in which the sensitivity adjustment interval signal SSAI has a high level. The time interval may be based on the value of the transmission/reception clock delay corresponding to the distance from the pulse radar apparatus 100 to the obstacle 11. The pulse radar apparatus 100 may adjust a point in time when the sensitivity adjustment interval signal SSAI starts to have a high level. For example, the time interval in which the sensitivity adjustment interval signal SSAI has the high level may correspond to a time interval in which the disturb pulse DP reflected from the obstacle 11 is received. Accordingly, a point in time when the gain of the amplifier 132 decreases and the length of the reduced time interval may be adjusted. As a result, the reception signal obtained from the disturb pulse DP associated with the obstacle 11 may be less amplified by the amplifier 132.

FIG. 3B illustrates a block diagram of a pulse radar apparatus, according to another embodiment of the present disclosure. A difference between the pulse radar apparatus 100a of FIG. 3A and a pulse radar apparatus 100b of FIG. 3B will be described with reference to FIGS. 1, 3A, and 3B.

Unlike the embodiment shown in FIG. 3A, in an embodiment shown in FIG. 3B, the pulse radar apparatus 100b may further include a transmission/reception switch 140 and a transmission/reception antenna 150. A transmitter 120b and a receiver 130b may be connected to the transmission/reception antenna 150 through the transmission/reception switch 140. In other words, the transmitter 120b and the receiver 130b may share the transmission/reception antenna 150.

The transmission/reception switch 140 may selectively connect one of the transmitter 120b and the receiver 130b to the transmission/reception antenna 150 based on a switch signal STRSW. The switch signal STRSW may be applied to the transmission/reception switch 140 from an external device of the pulse radar apparatus 100b or a controller in the pulse radar apparatus 100b.

The transmission/reception antenna 150 may radiate the transmission pulse TP or may receive the disturb pulse DP or the echo pulse EP. For example, the transmission/reception switch 140 may connect the transmitter 120b to the transmission/reception antenna 150 and may disconnect the receiver 130b from the transmission/reception antenna 150. The transmitter 120b may output the transmission signal TS to the transmission/reception antenna 150 through the transmission/reception switch 140. The transmission/reception antenna 150 may radiate the transmission pulse TP based on the transmission signal TS. As another example, the transmission/reception switch 140 may connect the receiver 130b to the transmission/reception antenna 150, and disconnect the transmitter 120b from the transmission/reception antenna 150. The transmission/reception antenna 150 may receive the disturb pulse DP or the echo pulse EP. The transmission/reception antenna 150 may introduce the reception signal RS based on the received pulse. The receiver 130b may obtain the reception signal RS from the transmission/reception antenna 150 through the transmission/reception switch 140.

The transmission/reception switch 140 may obtain the sensitivity adjustment interval signal SSAI from the clock generator 110. The transmission/reception switch 140 may control a connection between the transmission/reception antenna 150 and the receiver 130b based on the sensitivity adjustment interval signal SSAI. For example, the transmission/reception switch 140 may disconnect the receiver 130b from the transmission/reception antenna 150 in response to the sensitivity adjustment interval signal SSAI of a high level, regardless of a state of the switch signal STRSW (or the receiver 130b and the transmission/reception antenna 150 may be separated from each other). Accordingly, the reception signal RS applied from the transmission/reception antenna 150 to the receiver 130b may be blocked. As the reception signal RS is blocked, the disturb pulse DP may be substantially blocked from the receiver 130b. Accordingly, the influence of the disturb pulse DP on the receiver 130 may be reduced.

As another example, the transmission/reception switch 140 may adjust attenuation at a point in time when the receiver 130b connects to the transmission/reception antenna 150, based on the sensitivity adjustment interval signal SSAI. The transmission/reception switch 140 may connect the receiver 130b to the transmission/reception antenna 150 based on the sensitivity adjustment interval signal SSAI of a high level such that the receiver 130b has a high attenuation value.

As another example, when the sensitivity adjustment interval signal SSAI has one of various analog voltage values, the transmission/reception switch 140 may adjust the attenuation between the receiver 130b and the transmission/reception antenna 150 based on the voltage level of the sensitivity adjustment interval signal SSAI.

In an embodiment, the transmission/reception switch 140 may include a plurality of transistors. The plurality of transistors may be arranged in parallel between a terminal between the transmission/reception switch 140 and the receiver 130b and a terminal between the transmission/reception switch 140 and the transmission/reception antenna 150. Only a part of the plurality of transistors may be turned on in response to the sensitivity adjustment interval signal SSAI of a high level. Accordingly, the reception signal RS applied from the transmission/reception antenna 150 to the receiver 130b may be attenuated. As a result, the influence of the disturb pulse DP on the receiver 130 may be reduced by applying the sensitivity adjustment interval signal SSAI of a high level to the transmission/reception switch 140 when the disturb pulse DP is received.

When the sensitivity adjustment interval signal SSAI is a signal having one of various analog voltage values, only the part of the plurality of transistors of the transmission/reception switch 140 may be turned on in response to the voltage level of the sensitivity adjustment interval signal SSAI. The number of transistors that are turned on in response to the voltage level of the sensitivity adjustment interval signal SSAI may be inversely proportional to the voltage level of the sensitivity adjustment interval signal SSAI.

Figure 4:
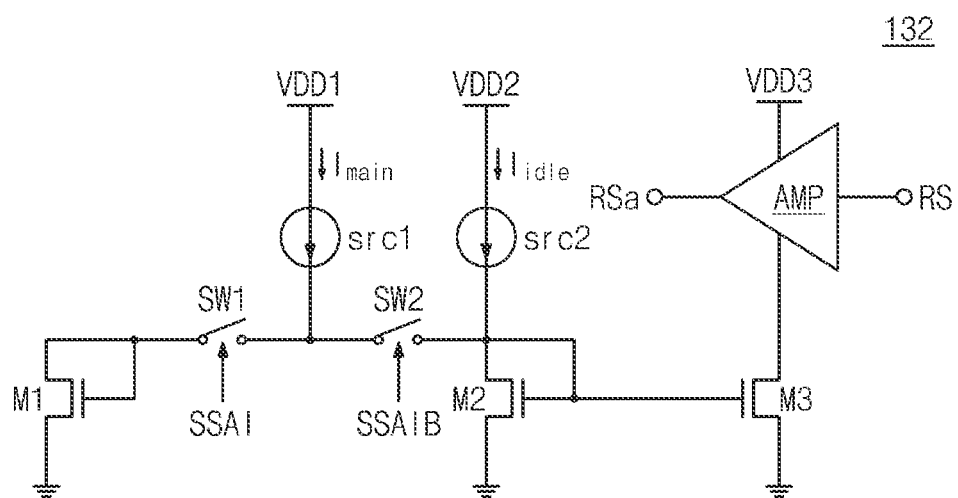
FIG. 4 illustrates a circuit diagram of the amplifier of FIG. 3A.

FIG. 4 illustrates a circuit diagram of the amplifier of FIG. 3A. Referring to FIGS. 1, 3A, and 4, the amplifier 132 may include transistors (M1, M2, M3), current sources (src1, src2), switches (SW1, SW2), and an amplifier AMP. The supply drain voltages (VDD1, VDD2, VDD3) may be supplied from an external device of the pulse radar apparatus 100 or may be supplied from a voltage generator (not shown) inside the pulse radar apparatus 100. The supply voltages (VDD1, VDD2, VDD3) may have amplitudes the same as or different from one another.

The amplifier AMP may include an input terminal to which the reception signal RS is applied from the reception antenna 133 or the transmission/reception antenna 150, an output terminal to which the amplified reception signal RSa is output, a first terminal to which the supply voltage VDD3 is applied, and a second terminal connected to the first terminal (e.g., a drain) of the transistor M3. The amplifier AMP may be implemented as a low-noise amplifier, or the like.

A gate and a first terminal (e.g., a drain) of the transistor M1 may be tied together. A ground voltage may be applied to a second terminal (e.g., a source) of the transistor M1. That is, the transistor M1 may be a diode connection configuration. The transistor M1 may be implemented with an n-type MOSFET.

A first terminal of the switch SW1 may be connected to the first terminal of the transistor M1. A second terminal of the switch SW1 may be connected to an output terminal of the current source src1 and a first terminal of the switch SW2. The switch SW1 may obtain the sensitivity adjustment interval signal SSAI from the clock generator 110. The switch SW1 may be shorted or opened in response to the sensitivity adjustment interval signal SSAI.

The first terminal of the switch SW2 may be connected to the output terminal of the current source src1 and the second terminal of the switch SW1. A second terminal of the switch SW2 may be connected to the output terminal of the current source src2 and a first terminal (e.g., a drain) of the transistor M2 implemented in a diode connection configuration. The switch SW2 may obtain a complementary sensitivity adjustment interval signal SSAIB from the clock generator 110. The complementary sensitivity adjustment interval signal SSAIB may be a signal obtained by inverting the sensitivity adjustment interval signal SSAI. That is, the complementary sensitivity adjustment interval signal SSAIB and the sensitivity adjustment interval signal SSAI may be complementary to each other. The switch SW2 may be shorted or opened in response to the complementary sensitivity adjustment interval signal SSAIB.

The current source src1 may obtain the supply voltage VDD1. The current source src1 may supply an operating current $I_{main}$. The current source src2 may obtain the supply voltage VDD2. The current source src2 may supply an idle current $I_{idle}$.

The first terminal of the transistor M2 implemented in a diode connection configuration may be connected to the second terminal of the switch SW2 and the output terminal of the current source src2. The ground voltage may be applied to a second terminal (e.g., a source) of the transistor M2 implementing a diode connection. The transistor M2 may be implemented with an n-type MOSFET.

The transistor M3 may include a first terminal connected to the second terminal of the amplifier AMP, a gate connected to the gate of the transistor M2, and a second terminal (e.g., a source) to which the ground voltage is applied. The transistor M3 may be implemented with an n-type MOSFET.

In the illustrated embodiment, the transistor M3 may be a tail transistor corresponding to a current source of the amplifier AMP. The transistors (M2, M3) may form a current mirror.

In response to the sensitivity adjustment interval signal SSAI of a high level, the switch SW1 may be shorted, and the switch SW2 may be opened. Because the sensitivity adjustment interval signal SSAI and the complementary sensitivity adjustment interval signal SSAIB are complementary to each other, the first switch SW1 and the second switch SW2 may be complementarily shorted and opened. Accordingly, the main current $I_{main}$ may be supplied to the transistor M1 and may not be supplied to the transistor M2. The idle current $I_{idle}$ may be supplied to the transistor M2. Accordingly, the amplifier AMP may be biased only by the idle current $I_{idle}$. As a result, in a time interval in which the sensitivity adjustment interval signal SSAI has a high level, the gain of the amplifier AMP may be reduced.

In response to the sensitivity adjustment interval signal SSAI of a low level, the switch SW1 may be opened, and the switch SW2 may be shorted. Accordingly, both the main current $I_{main}$ and the idle current $I_{idle}$ may be supplied to the transistor M2. The amplifier AMP may be biased by both the main current $I_{main}$ and the idle current $I_{idle}$. As a result, in a time interval in which the sensitivity adjustment interval signal SSAI has a low level, the gain of the amplifier AMP may be increased (alternatively, in the time interval, the amplifier AMP may maintain a high gain).

Regardless of the voltage level of the sensitivity adjustment interval signal SSAI, the idle current $I_{idle}$ is always supplied to the transistor M2. Accordingly, the voltage of the gate of the transistor M2 may be maintained to a threshold voltage or more. Alternatively, the voltage of the gate of the transistor M2 may be maintained to a subthreshold voltage close to the threshold voltage. As a result, the amplifier AMP may always be biased by the idle current $I_{idle}$. Accordingly, the gain of the amplifier AMP may be quickly changed in response to a change in the voltage level of the sensitivity adjustment interval signal SSAI. As a result, the pulse radar apparatus 100a may quickly change the sensitivity of the receiver 130a. Accordingly, as the reception sensitivity of the receiver 130a is lowered, a blind range in which the pulse radar apparatus 100a is incapable of detecting targets may be prevented from being widened.

Unlike the illustration of FIG. 4, the amplifier 132 may include three or more current sources connected to a current mirror. During a sensitivity adjustment interval in which the sensitivity adjustment interval signal SSAI has a high level, currents supplied from current sources may be bypassed to another path different from a path of the current mirror composed of the transistor M2 and the transistor M3. In other words, during the sensitivity adjustment interval, currents may be supplied to another transistor (e.g., the transistor M1) that is not connected to the current mirror. The gain of the amplifier 132 may be adjusted to various values depending on the number of current sources.

Figure 5A:
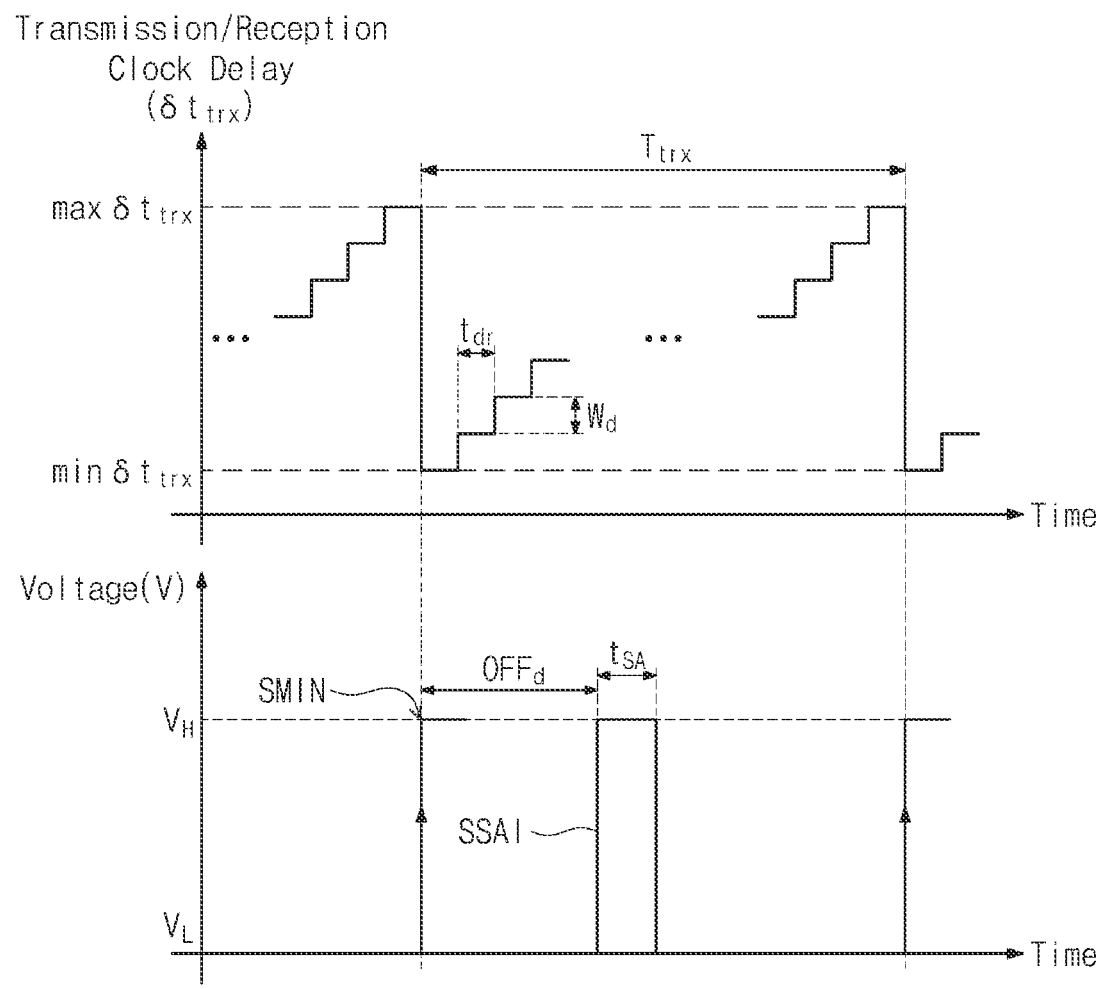
FIG. 5A illustrates a timing diagram of signals generated by the clock generator of FIG. 1 depending on a transmission/reception clock delay, according to an embodiment of the present disclosure.

FIG. 5A illustrates a timing diagram of signals generated by the clock generator of FIG. 1 depending on a transmission/reception clock delay, according to an embodiment of the present disclosure. Referring to FIGS. 1, 2, 3A, 3B, and 5A, a value of the transmission/reception clock delay $\delta t_{trx}$ may be changed sequentially (or continuously or monotonically) between a maximum value (max $\delta t_{trx}$) and a minimum (min $\delta t_{trx}$) within one transmission/reception period $T_{trx}$ time. The transmission/reception clock delay $\delta t_{trx}$ may have a period corresponding to the transmission/reception period $T_{trx}$. The transmission/reception period $T_{trx}$ may be a time required for the pulse radar apparatus 100 to detect objects located from a minimum detection distance to a maximum detection distance.

The value of the transmission/reception clock delay $\delta t_{trx}$ may be determined by an operation of a delay lock loop of the clock generator 110. The value of the transmission/reception clock delay $\delta t_{trx}$ may correspond to a detection distance of the pulse radar apparatus 100. For example, the maximum value (max $\delta t_{trx}$) may correspond to a maximum detection distance of the pulse radar apparatus 100. The minimum value (min $\delta t_{trx}$) may correspond to a minimum detection distance of the pulse radar apparatus 100. The maximum value (max $\delta t_{trx}$) and the minimum value (min $\delta t_{trx}$) may be preset (or determined) values, respectively.

The value of the transmission/reception clock delay $\delta t_{trx}$ may increase sequentially from the minimum value (min $\delta t_{trx}$). For example, the transmission/reception clock delay $\delta t_{trx}$ may increase by a delay change width $W_d$ after a delay retention time $t_{dr}$ from a point in time when the transmission/reception clock delay $\delta t_{trx}$ starts to have the minimum value (min $\delta t_{trx}$). After increasing by the delay change width $W_d$ from the minimum value (min $\delta t_{trx}$), the transmission/reception clock delay $\delta t_{trx}$ may increase by the delay change width $W_d$ again after the delay retention time $t_{dr}$. In a similar manner, the transmission/reception clock delay $\delta t_{trx}$ may increase up to the maximum value (max $\delta t_{trx}$). After the delay retention time $t_{dr}$ from a point in time when the transmission/reception clock delay $\delta t_{trx}$ reaches to have the maximum value (max $\delta t_{trx}$) (or after the transmission/reception period $T_{trx}$ from a point in time when the transmission/reception clock delay $\delta t_{trx}$ starts to have the minimum value (min $\delta t_{trx}$), the transmission/reception clock delay $\delta t_{trx}$ may return to the minimum value (min $\delta t_{trx}$) again. As a result, as illustrated in FIG. 5A, the transmission/reception clock delay $\delta t_{trx}$ may have a stair function waveform having a period corresponding to the transmission/reception period $T_{trx}$.

Unlike the illustration of FIG. 5A, the value of the transmission/reception clock delay $\delta t_{trx}$ may be sequentially reduced from the maximum value (max $\delta t_{trx}$) to the minimum value (min $\delta t_{trx}$).

When the transmission/reception clock delay $\delta t_{trx}$), has the minimum value (min $\delta t_{trx}$), the clock generator 110 may output a minimum detection range signal SMIN having a high-level voltage $V_H$. The minimum detection range signal SMIN may correspond to a state where the transmission/reception clock delay $\delta t_{trx}$ is the minimum value (min $\delta t_{trx}$). In the illustrated embodiment, the high-level voltage $V_H$ may correspond to a logic high state. The low-level voltage $V_L$ may correspond to a logic low state. After a delay offset $OFF_d$ from a point in time when the minimum detection range signal SMIN having the high-level voltage $V_H$ is output, the clock generator 110 may output the sensitivity adjustment interval signal SSAI having the high-level voltage $V_H$. The sensitivity adjustment interval signal SSAI may have the high-level voltage $V_H$ during the sensitivity adjustment interval $t_{SA}$. Accordingly, during the sensitivity adjustment interval $t_{SA}$ after the delay offset $OFF_d$ from a point in time when the minimum detection range signal SMIN having the high-level voltage $V_H$ is generated, the reception sensitivity of the receiver 130 may be lowered.

In an embodiment, the delay offset $OFF_d$ and the sensitivity adjustment interval $t_{SA}$ may be determined based on a result of processing the sampled reception signal RSs that is obtained from the disturb pulse DP. The delay offset $OFF_d$ and the sensitivity adjustment interval $t_{SA}$ may correspond to a distance between the pulse radar apparatus 100 and the obstacle 11.

In another embodiment, the length of the delay offset $OFF_d$ and the length of the sensitivity adjustment interval $t_{SA}$ may be changed. The clock generator 110 may include a variable delay element for generating the sensitivity adjustment interval signal SSAI, depending on the length of the variable delay offset $OFF_d$ and the length of the sensitivity adjustment interval $t_{SA}$. For example, the clock generator 110 may include the variable delay element composed of a plurality of buffers that are connected to one another in series. The clock generator 110 may output the sensitivity adjustment interval signal SSAI, based on signals output from output terminals of the buffers that are based on the length of the variable delay offset $OFF_d$ and the length of the sensitivity adjustment interval $t_{SA}$.

Figure 5B:
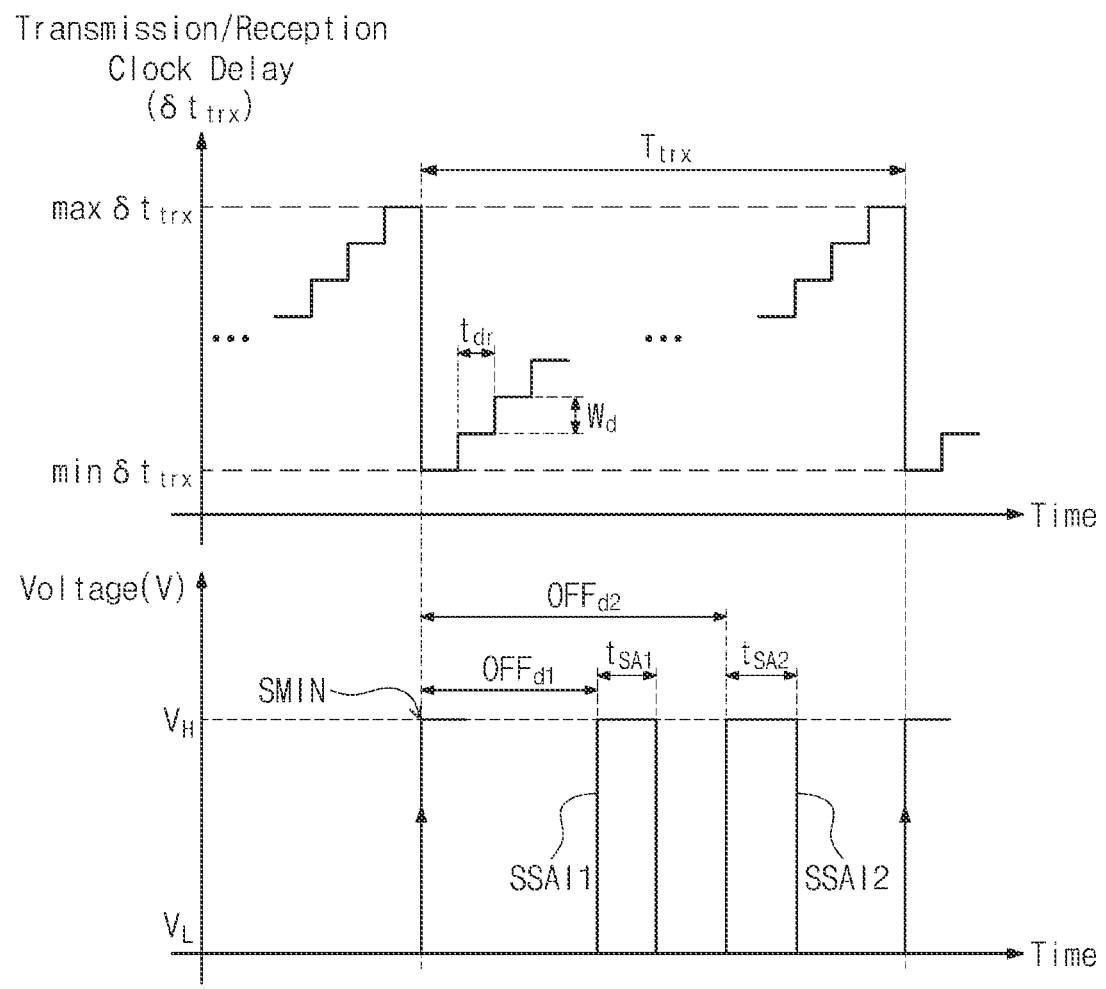
FIG. 5B illustrates a timing diagram of signals generated by the clock generator of FIG. 1 depending on a transmission/reception clock delay, according to another embodiment of the present disclosure.

FIG. 5B illustrates a timing diagram of signals generated by the clock generator of FIG. 1 depending on a transmission/reception clock delay, according to another embodiment of the present disclosure. A difference between the embodiment shown in FIG. 5A and an embodiment shown in FIG. 5B will be described with reference to FIGS. 1, 2, 3A, 3B, 5A, and 5B.

In the embodiment shown in FIG. 5B, the sensitivity adjustment interval signal SSAI may include a first sensitivity adjustment interval signal SSAI1 and a second sensitivity adjustment interval signal SSAI2. During a first sensitivity adjustment interval $t_{SA1}$ after a first delay offset $OFF_{d1}$ from a point in time when the minimum detection range signal SMIN is output from the clock generator 110, the first sensitivity adjustment interval signal SSAI1 may have the high-level voltage $V_H$. During a second sensitivity adjustment interval $t_{SA2}$ after a second delay offset $OFF_{d2}$ from a point in time the minimum detection range signal SMIN is output from the clock generator 110, the second sensitivity adjustment interval signal SSAI2 may have the high-level voltage $V_H$. The first delay offset $OFF_{d1}$ and the second delay offset $OFF_{d2}$ may be different from each other. The first sensitivity adjustment interval $t_{SA1}$ and the second sensitivity adjustment interval $t_{SA2}$ may be the same as or different from each other.

In the illustrated embodiment, the sensitivity of the receiver 130 may decrease during the first sensitivity adjustment interval $t_{SA1}$ in response to the first sensitivity adjustment interval signal SSAI1. Afterward, the sensitivity of the receiver 130 may decrease again during the second sensitivity adjustment interval $t_{SA2}$, in response to the second sensitivity adjustment interval signal SSAI2.

Unlike the illustration of FIG. 1, a plurality of obstacles may be present between the pulse radar apparatus 100 and the target 12. The pulse radar apparatus 100 may reduce the sensitivity of the receiver 130 several times within the single transmission/reception period $T_{trx}$, by generating a plurality of sensitivity adjustment interval signals. Accordingly, the deterioration of the receiver 130 due to disturb pulses respectively reflected from a plurality of obstacles may be more effectively prevented.

Unlike the illustration of FIG. 5B, the clock generator 110 may generate three or more sensitivity adjustment interval signals. Delay offsets respectively corresponding to sensitivity adjustment interval signals may be different from one another. The sensitivities of the receiver 130, which are respectively adjusted in response to the sensitivity adjustment interval signals, may also be different from one another. For example, the sensitivity of the receiver 130 corresponding to the first sensitivity adjustment interval signal SSAI1 may be lower than the sensitivity of the receiver corresponding to the second sensitivity adjustment interval signal SSAI2. As another example, the receiver 130 may include a plurality of amplifiers. Each of the amplifiers may be implemented similarly to the amplifier 132. In this case, a gain feature of an amplifier corresponding to (or adjusted based on the first sensitivity adjustment interval signal SSAI1) the first sensitivity adjustment interval signal SSAI1 may be different from a gain feature of an amplifier corresponding to the second sensitivity adjustment interval signal SSAI2.

Unlike the illustration of FIGS. 5A and 5B, the clock generator 110 may generate a sensitivity adjustment interval signal having an analog voltage value. The clock generator 110 may generate a plurality of sensitivity adjustment interval signals having different analog voltage values. Accordingly, sensitivities of the receiver 130 that are respectively adjusted in response to a plurality of sensitivity adjustment interval signals may also be different from one another.

Figure 6:
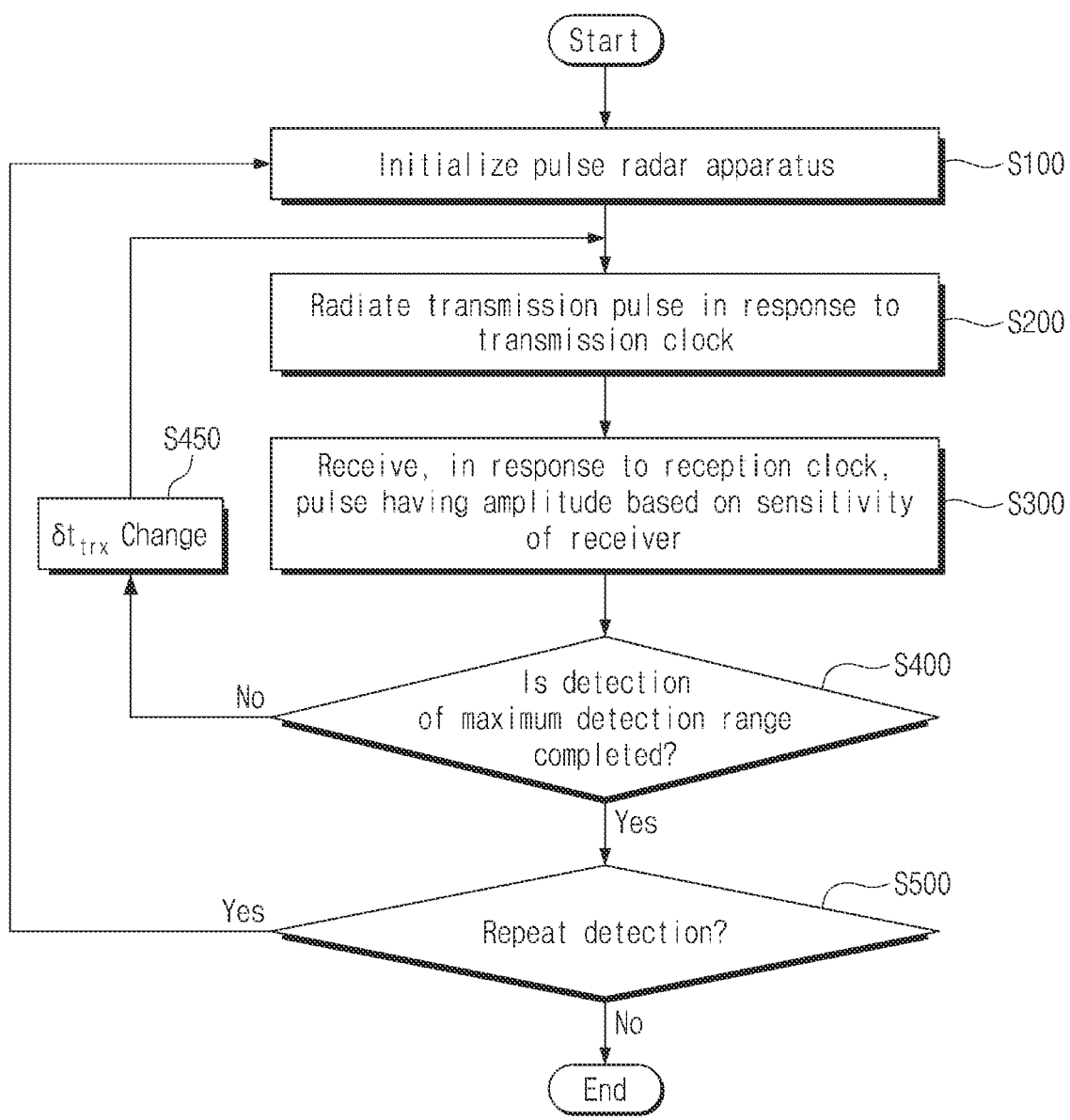
FIG. 6 illustrates a flowchart of an operating method of a pulse radar apparatus, according to an embodiment of the present disclosure.

FIG. 6 illustrates a flowchart of an operating method of a pulse radar apparatus, according to an embodiment of the present disclosure. Referring to FIGS. 1, 2, 3A, 3B, 5, and 6, the pulse radar apparatus 100 of FIG. 1 may perform operation S100 to operation S500.

In an embodiment, the transmission clock tCLK and the reception clock rCLK may be a pair; a duration between the transmission clock tCLK and the reception clock rCLK may be the transmission/reception clock delay $\delta t_{trx}$. The pulse radar apparatus may detect a single point located within the detection range with the transmission clock tCLK and the reception clock rCLK pair. After detecting with the pair, the pulse radar apparatus may determine whether to increase the transmission/reception clock delay $\delta t_{trx}$ and further to detect another single point range within the detection range with another transmission clock/reception clock pair and the increased transmission/reception clock delay $\delta t_{trx}$.

In the embodiment, the sensitivity of the receiver 130 may be adjusted between the transmission clock tCLK and the reception clock rCLK; or may be adjusted before the reception clock rCLK is applied. However, the present disclosure is not limited thereto. For example, the sensitivity of the receiver 130 may not be adjusted for the other transmission clock/reception clock pair; that is, the sensitivity adjust interval signal SSAI may remain as a consistent level for the other transmission clock/reception clock pair. In this case, the sensitivity of the receiver 130 may not be changed for the other transmission clock/reception clock pair.

In operation S100, the pulse radar apparatus 100 may be initialized. For example, the transmission/reception clock delay $\delta t_{trx}$ and the reception sensitivity of the receiver 130 may be set to initial values. In an embodiment, the initial value of transmission/reception clock delay $\delta t_{trx}$ may be a minimum value (e.g., the minimum value (min $\delta t_{trx}$) in FIG. 5A) of the transmission/reception clock delay $\delta t_{trx}$. The initial value of the reception sensitivity of the receiver 130 may be a value at which the gain of the amplifier 132 is maximized.

In operation S200, the pulse radar apparatus 100 may radiate the transmission pulse TP in response to the transmission clock tCLK. For example, the transmitter 120a may radiate the transmission pulse TP through the transmission antenna 123 in response to a rising edge of the transmission clock tCLK generated by the clock generator 110. As another example, the transmitter 120b may be connected to the transmission/reception antenna 150 through the transmission/reception switch 140 in response to the switch signal STRSW. The transmitter 120b may radiate the transmission pulse TP through the transmission/reception antenna 150.

In operation S300, the pulse radar apparatus 100 may receive, in response to the reception clock rCLK, a pulse having amplitude based on the sensitivity of the receiver 130a. For example, while the sensitivity of the receiver 130a is reduced in response to the sensitivity adjustment interval signal SSAI at a high level, the pulse radar apparatus 100 may receive a pulse having a relatively small amplitude in response to the reception clock rCLK. For another example, while the sensitivity of the receiver 130a is not reduced in response to the sensitivity adjustment interval signal SSAI at a low level, the pulse radar apparatus 100 may receive a pulse having a relatively big amplitude in response to the reception clock rCLK.

In operation S400, the pulse radar apparatus 100 may determine whether the pulse radar apparatus 100 has detected a maximum detection range, based on the value of the transmission/reception clock delay $\delta t_{trx}$. When it is determined that the maximum detection distance (max range) has not been detected, the pulse radar apparatus 100 may change the value of the transmission/reception clock delay $\delta t_{trx}$ in operation S450. The pulse radar apparatus 100 may further increase the detection distance by increasing the value of the transmission/reception clock delay $\delta t_{trx}$. The pulse radar apparatus 100 may adjust the value of the transmission/reception clock delay $\delta t_{trx}$ and may perform operation S200 again. When it is determined that the maximum detection distance (max range) is detected, the pulse radar apparatus 100 may perform operation S500.

In operation S500, the pulse radar apparatus 100 may determine whether to repeat detection. When it is determined that the detection is to be repeated, the pulse radar apparatus 100 may perform operation S100 again. When it is determined that the detection is not to be repeated, the pulse radar apparatus 100 may end the detection.

Figure 7:
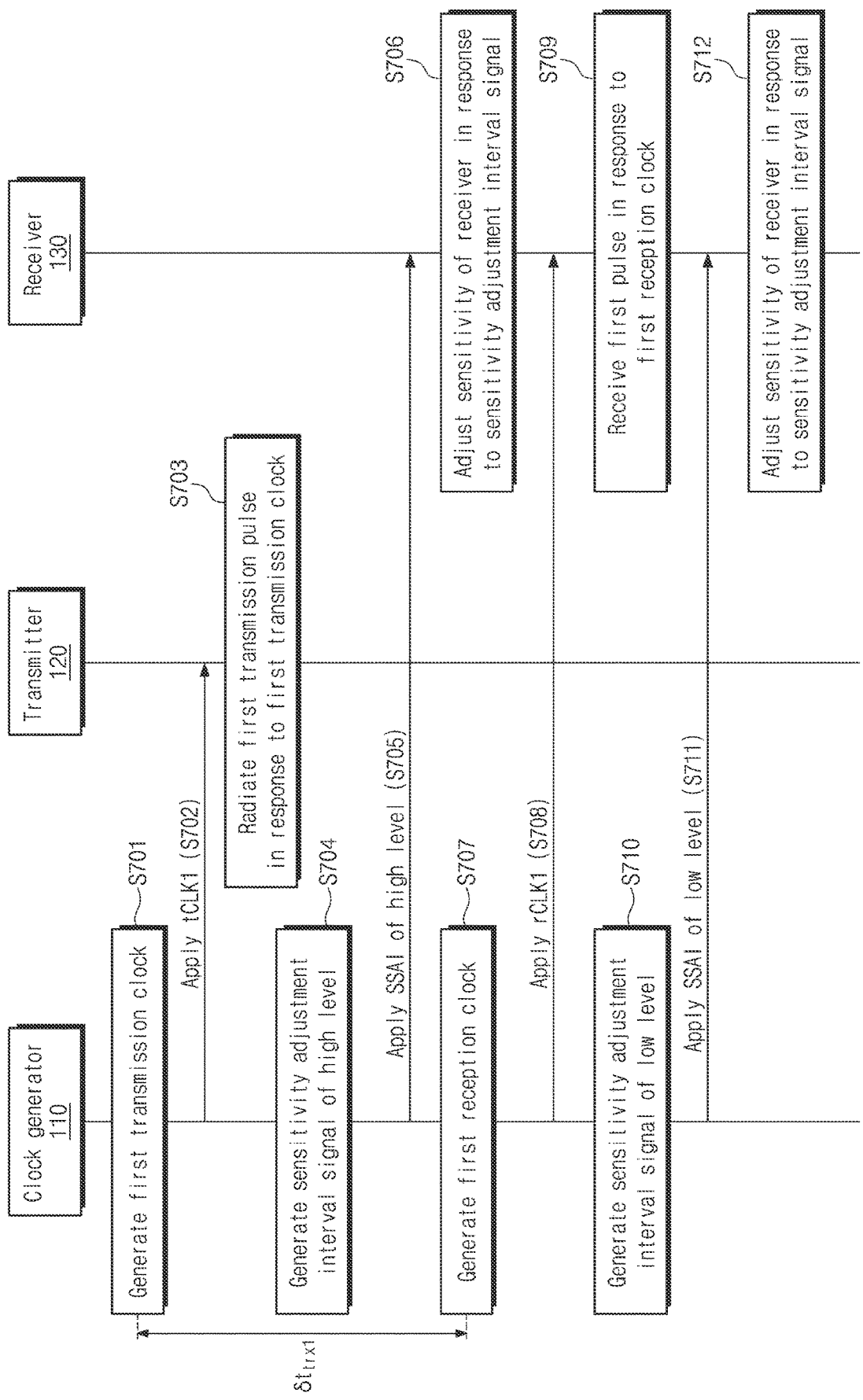
FIG. 7 illustrates a flowchart of an operating method of a pulse radar apparatus, according to another embodiment of the present disclosure.

FIG. 7 illustrates a flowchart of an operating method of a pulse radar apparatus, according to another embodiment of the present disclosure. Referring to FIGS. 1, 2, 3A, 3B, 5, 6, and 7, the pulse radar apparatus 100 may sequentially perform operation S701 to operation S712. In more detail, the clock generator 110 of the pulse radar apparatus 100 may perform operation S701, operation S702, operation S704, operation S705, operation S707, operation S708, operation S710, and operation S711. The transmitter 120 of the pulse radar apparatus 100 may perform operation S703. Furthermore, the receiver 130 of the pulse radar apparatus 100 may perform operation S706, operation S709, and operation S712.

In operation S701, the clock generator 110 may generate a first transmission clock tCLK1. For example, similarly to the method described above with reference to FIG. 2, the clock generator 110 may generate the first transmission clock tCLK1.

In operation S702, the clock generator 110 may apply the first transmission clock tCLK1 to the transmitter 120.

In operation S703, the transmitter 120 may radiate a first transmission pulse in response to the first transmission clock tCLK1. For example, the transmitter 120 may radiate the first transmission pulse in a manner similar to a manner in operation S200 of FIG. 6.

In operation S704, the clock generator 110 may generate the sensitivity adjustment interval signal SSAI of a high level. Similarly to the manners described above with reference to FIGS. 5A and 5B, the clock generator 110 may generate the sensitivity adjustment interval signal SSAI.

In operation S705, the clock generator 110 may apply the sensitivity adjustment interval signal SSAI of a high level to the receiver 130.

In operation S706, the receiver 130 may adjust the sensitivity in response to the sensitivity adjustment interval signal SSAI. For example, the sensitivity of the receiver 130 may be lowered in response to the sensitivity adjustment interval signal SSAI of a high level.

In operation S707, the clock generator 110 may generate a first reception clock rCLK1. For example, similarly to the method described above with reference to FIG. 2, the clock generator 110 may generate the first reception clock rCLK1. An interval between the first transmission clock tCLK1 and the first reception clock rCLK1 may be a first transmission/reception clock delay $\delta t_{trx1}$.

In operation S708, the clock generator 110 may apply the first reception clock rCLK1 to the receiver 130.

In operation S709, the receiver 130 may receive a first pulse in response to the first reception clock rCLK1 that is generated, while the sensitivity adjustment interval signal SSAI has a high level. The first pulse may be determined as the disturb pulse DP by the pulse radar apparatus 100. Because the sensitivity of the receiver 130 has decreased due to operation S706, the performance of the receiver 130 may not deteriorate due to the disturb pulse DP.

In operation S710, the clock generator 110 may generate the sensitivity adjustment interval signal SSAI of a low level. In the illustrated embodiment, the sensitivity adjustment interval signal SSAI may have a high level during the sensitivity adjustment interval $t_{SA}$ and may have a low level during the remaining intervals.

In operation S711, the clock generator 110 may apply the sensitivity adjustment interval signal SSAI of a low level to the receiver 130.

In operation S712, the receiver 130 may adjust the sensitivity in response to the sensitivity adjustment interval signal SSAI. For example, the sensitivity of the receiver 130 may be increased in response to the sensitivity adjustment interval signal SSAI of a low level.

FIG. 8 illustrates a flowchart of an operating method of a pulse radar apparatus, according to still another embodiment of the present disclosure. Referring to FIGS. 1, 2, 3A, 3B, 5, 6, and 8, the pulse radar apparatus 100 may sequentially perform operations from operation S801 to operation S812. In more detail, the clock generator 110 of the pulse radar apparatus 100 may perform operation S801, operation S802, operation S804, operation S805, operation S807, operation S808, operation S810, and operation S811. The transmitter 120 of the pulse radar apparatus 100 may perform operation S803. Furthermore, the receiver 130 of the pulse radar apparatus 100 may perform operation S806, operation S809, and operation S812.

In operation S801, the clock generator 110 may generate a second transmission clock tCLK2. In operation S802, the clock generator 110 may apply the second transmission clock tCLK2 to the transmitter 120.

In operation S803, the transmitter 120 may radiate a second transmission pulse in response to the second transmission clock tCLK2.

In operation S804, the clock generator 110 may generate the sensitivity adjustment interval signal SSAI of a high level. In operation S805, the clock generator 110 may apply the sensitivity adjustment interval signal SSAI of a high level to the receiver 130.

In operation S806, the receiver 130 may adjust the sensitivity in response to the sensitivity adjustment interval signal SSAI. For example, the sensitivity of the receiver 130 may be lowered in response to the sensitivity adjustment interval signal SSAI of a high level.

In operation S807, the clock generator 110 may generate the sensitivity adjustment interval signal SSAI of a low level.

In operation S808, the clock generator 110 may apply the sensitivity adjustment interval signal SSAI of a low level to the receiver 130.

In operation S809, the receiver 130 may adjust the sensitivity in response to the sensitivity adjustment interval signal SSAI. For example, the sensitivity of the receiver 130 may be increased in response to the sensitivity adjustment interval signal SSAI of a low level.

In operation S810, the clock generator 110 may generate a second reception clock rCLK2. An interval between the second transmission clock tCLK2 and the second reception clock rCLK2 may be a second transmission/reception clock delay $\delta t_{trx2}$. In operation S811, the clock generator 110 may apply the second reception clock rCLK2 to the receiver 130.

In operation S812, the receiver 130 may receive a second pulse in response to the second reception clock rCLK2 that is generated, when the sensitivity adjustment interval signal SSAI has a low level. The second pulse may be determined as the echo pulse EP by the pulse radar apparatus 100. Because the sensitivity of the receiver 130 is increased due to operation S809, it is advantageous to receive an echo pulse.

In an embodiment, the pulse radar apparatus 100 may generate the sensitivity adjustment interval signal SSAI based on the transmission/reception clock delay $\delta t_{trx}$. The pulse radar apparatus 100 may adjust the sensitivity of the receiver 130 by using the sensitivity adjustment interval signal SSAI. Accordingly, the influence of the disturb pulse DP, which is reflected and received from the obstacle 11, on the pulse radar apparatus 100 may be reduced. While excluding the influence of the disturb pulse DP, which has a relatively great amplitude, the pulse radar apparatus 100 may receive the echo pulse EP having a relatively small amplitude (or weak intensity) with high sensitivity.

The pulse radar apparatus 100 may adjust the sensitivity of the receiver 130 based on a distance between the pulse radar apparatus 100 and the obstacle 11. Accordingly, the pulse radar apparatus 100 may be used as penetrating radar. In other words, the pulse radar apparatus 100 may detect the target 12 behind the obstacle 11. The pulse radar apparatus 100 may adjust the sensitivity of the receiver 130, thereby preventing performance degradation of the receiver 130 due to a transmission medium (i.e., a medium of the obstacle 11).

In another embodiment, the present disclosure may be applied to a case where there is a target in a transmission medium. For example, the pulse radar apparatus 100 may detect a target in the ground, in a concrete medium, or the like. The disturb pulse DP having a relatively great amplitude on a boundary surface with the obstacle 11 may be radiated in response to a transmission pulse radiated from the transmitter 120 of the pulse radar apparatus 100. As the disturb pulse DP is received, the performance of the receiver 130 may be degraded. According to an embodiment of the present disclosure, the pulse radar apparatus 100 may receive the disturb pulse DP having a relatively great amplitude with low reception sensitivity and may receive the echo pulse EP from a target in a medium with high reception sensitivity. As a result, it is possible to prevent performance degradation due to saturation and nonlinear operations of the receiver 130 by the disturb pulse DP having a great amplitude. Accordingly, the performance of the pulse radar apparatus 100 may be improved.

In another embodiment, the pulse radar apparatus 100 may be implemented with a single chip. For example, the pulse radar apparatus 100 may be implemented with a System-on-Chip (SoC).

The above-mentioned description refers to embodiments for implementing the scope of the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, a pulse radar apparatus may generate a sensitivity adjustment interval signal based on a transmission/reception clock delay. The pulse radar apparatus may lower a sensitivity of a receiver during a time interval, in which a disturb pulse is received, by using a sensitivity control interval signal. Accordingly, it is possible to prevent the performance degradation of the pulse radar apparatus due to the disturb pulse.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pulse radar apparatus comprising:
   a clock generator which generates a transmission clock signal, a reception clock signal, and a sensitivity adjustment interval signal;
   a transmitter which radiates a transmission pulse based on the transmission clock signal; and
   a receiver which receives a first pulse and a second pulse, which are associated with the transmission pulse, with different sensitivities based on the reception clock signal and the sensitivity adjustment interval signal;
   wherein the clock generator
      generates a minimum detection range signal corresponding to a minimum transmission/reception clock delay time, which is an interval between the transmission clock signal and the reception clock signal and which is at a minimum value; and
      controls the sensitivity adjustment interval signal during a sensitivity adjustment interval after a delay offset from a point in time when the minimum detection range signal is generated,
   wherein a sensitivity of the receiver decreases during the sensitivity adjustment interval in response to the sensitivity adjustment interval signal, and
   wherein the sensitivity adjustment interval corresponds to a time interval in which the pulse radar apparatus receives a pulse in which the transmission pulse is reflected from a first object located between the pulse radar device and a second object.

2. The pulse radar apparatus of claim 1, further comprising:
   a reception antenna which:
   receives the first pulse and the second pulse; and
   delivers a first reception signal and a second reception signal to the receiver based on the received first pulse and the received second pulse, respectively,
   wherein the receiver includes an amplifier which:
   receives the first reception signal and the second reception signal from the reception antenna; and
   amplifies the received first reception signal and the received second reception signal, and
   wherein a gain of the amplifier is adjusted based on the sensitivity adjustment interval signal.

3. The pulse radar apparatus of claim 2, wherein the receiver further includes a first current source which supplies a main current and a second current source which supplies an idle current, and wherein the amplifier is biased by the idle current in response to an event in which the sensitivity adjustment interval signal has a high level, and is biased by both the main current and the idle current in response to an event in which the sensitivity adjustment interval signal has a low level.

4. The pulse radar apparatus of claim 2, wherein the receiver further includes a sampler which:

obtains the amplified first reception signal and the amplified second reception signal from the amplifier; and outputs a sampled first reception signal and a sampled second reception signal based on the reception clock signal, the amplified first reception signal, and the amplified second reception signal.

5. The pulse radar apparatus of claim 1, wherein a length of the delay offset and a length of the sensitivity adjustment interval are adjustable.

6. The pulse radar apparatus of claim 1, wherein the transmitter includes:

a variable oscillation interval generator which generates, based on a rising edge of the transmission clock signal and an oscillation interval control signal, a variable oscillation interval signal; and a voltage-controlled oscillator which generates a transmission signal of a first frequency in response to the variable oscillation interval signal.

7. The pulse radar apparatus of claim 1, further comprising:

a transmission/reception antenna which radiates the transmission pulse based on a transmission signal output from the transmitter and delivers a first reception signal and a second reception signal to the receiver based on receiving the first pulse and the second pulse; and a transmission/reception switch connected to the transmission/reception antenna and connected to one of the transmitter or the receiver based on a switch signal.

8. The pulse radar apparatus of claim 7, wherein, when the transmission/reception switch is connected to the receiver in response to the switch signal, the receiver adjusts gains of the first reception signal and the second reception signal, which are obtained from the transmission/reception antenna by the receiver, in response to the sensitivity adjustment interval signal.

9. The pulse radar apparatus of claim 1, wherein the clock generator includes a delay locked loop (DLL) which generates two or more clock signals based on a reference clock signal, and wherein the clock generator outputs one of the two or more clock signals as the transmission clock signal and outputs another of the two or more clock signals as the reception clock signal.

10. The pulse radar apparatus of claim 1, wherein a transmission/reception clock delay time, which is an interval between the transmission clock signal and the reception clock signal, monotonically increases from a minimum value to a maximum value at a first time incremental value or monotonically decreases from the maximum value to the minimum value at a first time interval.

11. A pulse radar apparatus comprising:

a clock generator which generates a transmission clock signal, a reception clock signal, and a sensitivity adjustment interval signal;

a transmitter which radiates a transmission pulse based on the transmission clock signal; and a receiver which receives a first pulse and a second pulse, which are associated with the transmission pulse, with different sensitivities based on the reception clock signal and the sensitivity adjustment interval signal, wherein the clock generator generates a minimum detection range signal corresponding to a minimum transmission/reception clock delay time, which is an interval between the transmission clock signal and the reception clock signal and which is a minimum value; and wherein the sensitivity adjustment interval signal includes a first sensitivity adjustment interval signal and a second sensitivity adjustment interval signal, wherein the sensitivity of the receiver is adjusted to a first sensitivity in response to the first sensitivity adjustment interval signal generated during a first sensitivity adjustment time interval after a first delay offset from a point in time when the minimum detection range signal is generated, and wherein the sensitivity of the receiver is adjusted to a second sensitivity in response to the second sensitivity adjustment interval signal generated during a second sensitivity adjustment time interval after a second delay offset from a point in time when the minimum detection range signal is generated.

12. The pulse radar apparatus of claim 11, further comprising:

a reception antenna which:

receives the first pulse and the second pulse; and delivers a first reception signal and a second reception signal based on the received first pulse and the received second pulse, respectively, wherein the receiver includes a first amplifier and a second amplifier, which obtain the first reception signal and the second reception signal from the reception antenna and amplify the obtained first reception signal and the received second reception signal, respectively, wherein a gain of the first amplifier is adjusted based on the first sensitivity adjustment interval signal, and wherein a gain of the second amplifier is adjusted based on the second sensitivity adjustment interval signal.

13. An operating method of a pulse radar, the method comprising:

radiating a first transmission pulse in response to a first transmission clock signal;

adjusting a sensitivity of a receiver in response to a first sensitivity adjustment interval signal; and receiving a first pulse associated with the first transmission pulse in response to a first reception clock signal, wherein the first sensitivity adjustment interval signal is generated after a first offset from a first point in time when the transmission clock signal is generated, wherein the first sensitivity adjustment interval signal is a signal for reducing the sensitivity of the receiver during a first sensitivity adjustment interval, wherein the first sensitivity adjustment interval corresponds to a time interval in which the pulse radar receives the first pulse reflected from a first object located between the pulse radar device and a second object, and wherein the first sensitivity adjustment interval signal has a high level during a first time interval from a point in time when a transmission/reception clock delay time, which is an interval between a point in time when the first transmission clock signal is generated and a point in time when the first reception clock signal is generated, is a minimum value and has a low level during a second time interval following the first time interval.

14. The method of claim 13, wherein the adjusting of the sensitivity of the receiver includes:
    decreasing a gain of an amplifier that amplifies a first reception signal based on the first pulse in response to the first sensitivity adjustment interval signal having the high level; and
    increasing the gain of the amplifier in response to the first sensitivity adjustment interval signal having the low level.

15. The method of claim 13, wherein the adjusting of the sensitivity of the receiver includes:
    connecting a transmission/reception switch, which delivers a first reception signal based on the first pulse from a transmission/reception antenna, to the receiver in response to a switch signal;
    disconnecting the transmission/reception switch from the receiver in response to the first sensitivity adjustment interval signal having the high level; and
    connecting the transmission/reception switch to the receiver in response to the first sensitivity adjustment interval signal having the low level.

16. The method of claim 13, wherein the first pulse, which is received during the first time interval in response to the first reception clock signal, is a first time pulse which is the first transmission pulse reflected from the first object, and
    wherein the first pulse, which is received during the second time interval in response to the first reception clock signal, is a second time pulse which is the first transmission pulse reflected from the second object.

17. The method of claim 16, further comprising:
    adjusting a length of the first time interval such that the first sensitivity adjustment interval signal has the high level from the point in time when the transmission/reception clock delay time is the minimum value to a point in time when the transmission/reception clock delay time is a value corresponding to a distance between the pulse radar and the first object.

18. The method of claim 16, further comprising:
    determining a value of a transmission/reception clock delay time corresponding to a distance between the pulse radar and the first object based on an amplitude of a reception signal generated based on the first time pulse.

* * * * *